United States Patent
Watanabe (10) Patent No.: US 6,459,065 B2
(45) Date of Patent: Oct. 1, 2002

(54) RESISTANCE WELDING POWER SUPPLY APPARATUS

(75) Inventor: Mikio Watanabe, Chiba-ken (JP)

(73) Assignee: Miyachi Technos Corporation, Chiba-ken (JP)

( * ) Notice: Subject to any disclaimer, the term of this patent is extended or adjusted under 35 U.S.C. 154(b) by 0 days.

(21) Appl. No.: 09/881,691

(22) Filed: Jun. 18, 2001

(30) Foreign Application Priority Data

Jun. 19, 2000 (JP) ......................................... 2000-182474

(51) Int. Cl.$^7$ .............................................. B23K 11/26
(52) U.S. Cl. ........................................ 219/113; 219/110
(58) Field of Search ................................... 219/113, 110

(56) References Cited

U.S. PATENT DOCUMENTS 6,011,235 A * 1/2000 Mukai et al. ............... 219/110
6,046,424 A * 4/2000 Jochi .......................... 219/110
6,137,077 A * 10/2000 Moro et al. .................. 219/110

* cited by examiner

Primary Examiner—Clifford C. Shaw
(74) Attorney, Agent, or Firm—Wenderoth, Lind & Ponack, L.L.P.

(57) ABSTRACT

Disclosed is a resistance welding power supply apparatus which comprises a large-capacitance capacitor for storing resistance welding energy in the form of electric charges, a charging circuit for charging the capacitor to a predetermined voltage, four switching elements or means electrically connected between the capacitor and a pair of welding electrodes, and a control unit for allowing selective switching operations of the switching elements during a weld time to provide a control of welding current. Diodes are connected in parallel with the switching elements, respectively, with current polarities opposite thereto. The control unit terminates a switching pause period for polarity switching in a very brief time and initiates a switching control in the next current-supplying mode in the middle of fall of the welding current.

8 Claims, 8 Drawing Sheets

$Q_1, Q_2 = ON$
$Q_3, Q_4 = OFF$

FIG.4

$Q_1 = OFF, Q_2 = ON$
$Q_3, Q_4 = OFF$

FIG.5

$Q_1, Q_2$ = OFF
$Q_3, Q_4$ = OFF

FIG.6

Q₁, Q₂ = OFF
Q₃, Q₄ = ON

FIG.7

Q₁, Q₂ = OFF
Q₃ = OFF, Q₄ = ON

FIG.8

Ta : AMBIENT TEMPERATURE

Ta : AMBIENT TEMPERATURE

US 6,459,065 B2

RESISTANCE WELDING POWER SUPPLY APPARATUS

BACKGROUND OF THE INVENTION

1. Field of the Invention

The present invention relates generally to a power supply apparatus for resistance welding, and more particularly to a polarity switching power supply apparatus designed to supply a welding current of AC waveform to workpieces.

2. Description of the Related Arts

A current-supplying system flowing AC waveform welding current is prevailing of late in two-point simultaneous joining resistance welding (series welding) which is mainly applied to workpieces in the form of small metal pieces such as electronic components. Reference is first made to FIGS. 9A to 9D which illustrates an example of the series welding based on such a current-supplying system.

In the series welding of FIGS. 9A to 9D, a pair of welding electrodes 10 and 12 abut against one surfaces of workpieces ($W_1$ and $W_2$) at spaced-apart positions and come into pressure contact with the workpieces ($W_1$ and $W_2$) by a pressure force from a pressure mechanism not shown. In this series welding there alternate a single positive current supplying in which the welding current flows in a positive direction and a single negative current supplying in which the welding current flows in a negative direction.

Figure 9A:
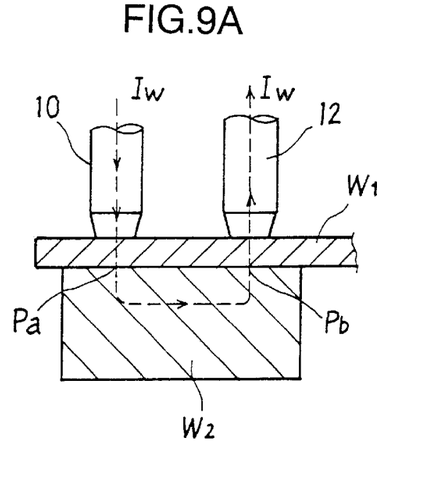
FIGS. 9A to 9D are explanatory diagrams of series welding based on a polarity switching system.
Figure 9B:
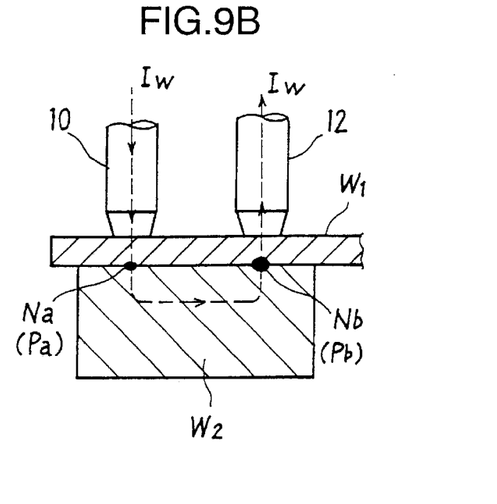

In the former-half positive current supplying (period $T_A$), a welding current $I_W$ flows in a positive direction through a path from the welding electrode 10 through the workpiece $W_1$, a first weld point Pa, the workpiece $W_2$, a second weld point Pb and again the workpiece $W_1$ to the welding electrode 12 as depicted in FIG. 9A. At that time, at the weld point Pa the welding current $I_W$ flows from the workpiece $W_1$ toward the workpiece $W_2$ whereas at the weld point Pb the welding current $I_W$ flows from the workpiece $W_2$ toward the workpiece $W_1$. As a result there arises for instance heat-absorbing Peltier effect at the first weld point Pa, with heat-generating Peltier effect at the second weld point Pb. Thus, in this positive current supplying, as shown in FIG. 9B a nugget Nb at the second weld point Pb can grow at a greater growth rate than a nugget Na at the first weld point Pa. At this point of time, the difference in size between the two nuggets Na and Nb may depend on e.g., material and thickness of the workpieces ($W_1$ and $W_2$), the length of the weld period $T_A$ and current value of the welding current $I_W$.

Figure 9C:
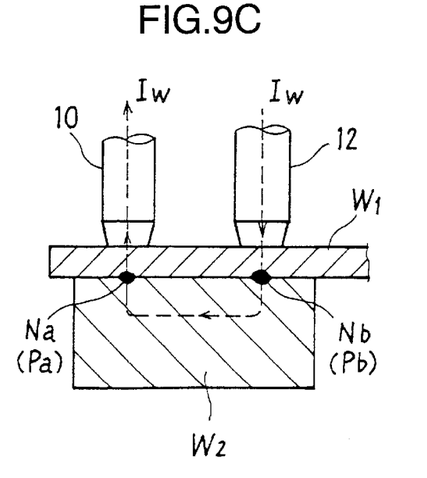
Figure 9D:
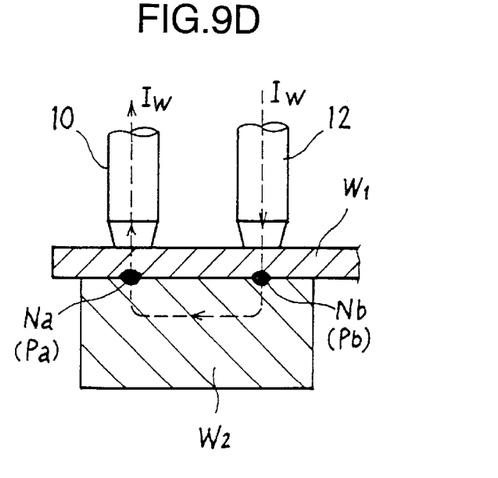

In the latter-half positive current supplying (period $T_B$), the welding current $I_W$ flows in a negative direction through a path from the welding electrode 12 through the workpiece $W_1$, the second weld point Pb, the workpiece $W_2$, the first weld point Pa and again the workpiece $W_1$ to the welding electrode 10 as depicted in FIG. 9C. At that time, at the weld point Pa the welding current $I_W$ flows from the workpiece $W_2$ toward the workpiece $W_1$ whereas at the weld point Pb the welding current $I_W$ flows from the workpiece $W_1$ toward the workpiece $W_2$. As a result there now arises heat-generating Peltier effect at the first weld point Pa, with heat-absorbing Peltier effect at the second weld point Pb. For this reason, in this negative current supplying, the nugget Na at the first weld point Pa can grow at a greater growth rate than the nugget Nb at the second weld point Pb.

Thus, by setting the weld period $T_B$ for the subsequent negative polarity current to a proper length in view of the weld period $T_A$ for the precedent positive polarity current, it is possible at the termination of the weld period $T_B$ to give substantially the same growth to both the nugget Na at the first weld point Pa and the nugget Nb at the second weld point Pb.

By alternating the positive current supplying for which the welding current $I_W$ flows in a positive direction and the negative current supplying for which the welding current $I_W$ flows in a negative direction, it is possible to cancel the influence of Peltier effect to achieve simultaneous joining at the two weld points (Pa and Pb) on the workpieces ($W_1$ and $W_2$) with substantially an even weld strength.

The conventional polarity switching resistance welding power supply apparatus for use in such a series welding is apt to suffer a significant drop in the temperature at the weld points which may occur upon switching of the polarity of current or switching of the polarity of welding current.

Figure 10:
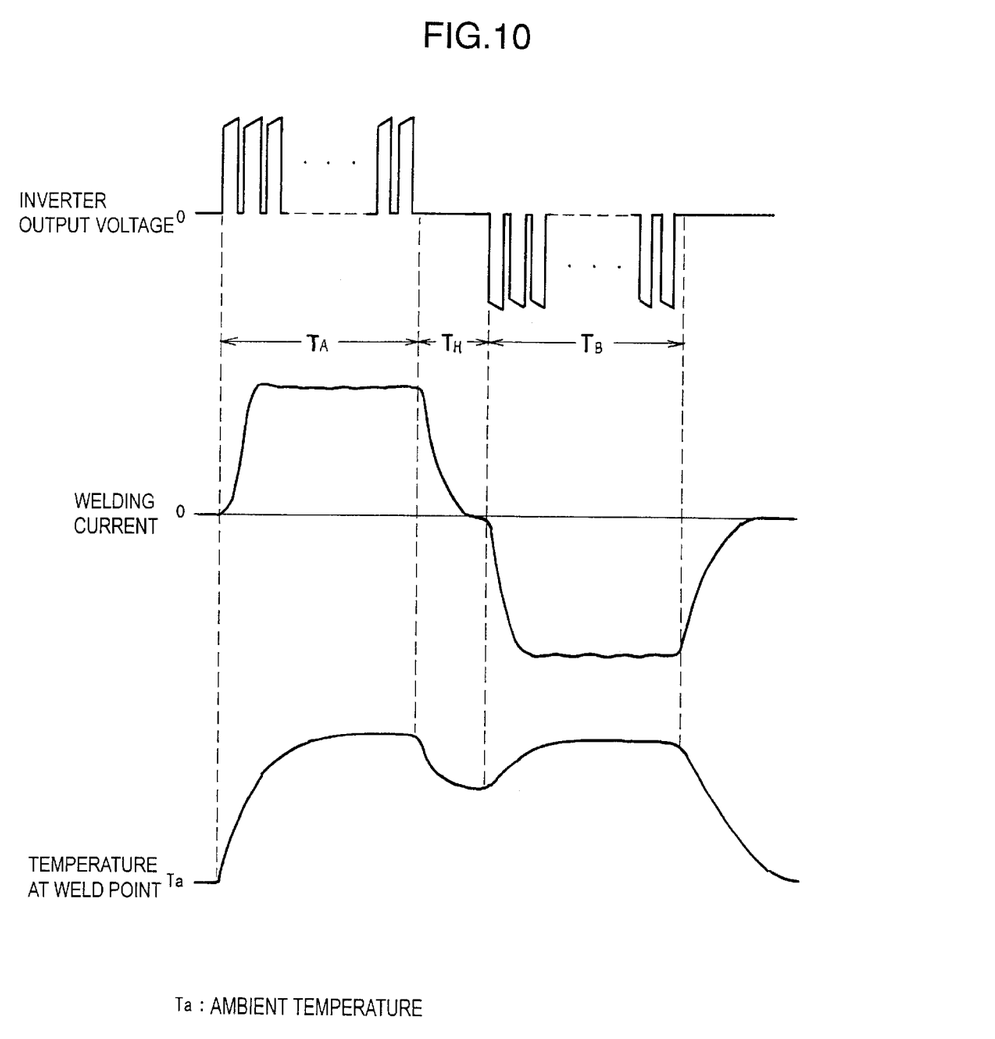
FIG. 10 illustrates time characteristics (waveforms) of the temperature at a weld point during the weld time in a conventional resistance welding power supply apparatus.

By way of example, in the conventional AC waveform inverter power supply apparatus, as seen in FIG. 10, the current supplying is paused till the shutoff of the positive welding current $I_W$ after the termination of the inverter switching operation in the positive current supplying (period $T_A$) SO that the inverter switching operation in the negative current supplying (period $T_B$) can start from no-current ($I_W$=0) status to cause the welding current $I_W$ to rise in the negative direction. Since the inverter power supply apparatus has a welding transformer intervening between the inverter output terminal and the welding electrode, the inverter tends to face a significantly large load inductance and a substantial time (e.g., 250 $\mu s$) is required for the fall of the welding current $I_W$ immediately after the stop of the inverter switching, making it difficult to reduce the falltime $T_H$.

Therefore, due to the consumption of substantial time for the fall of the welding current $I_W$ and to the delayed start of the next inverse polarity current, the resistance-heating temperature at the weld portions (esp., at and near the weld points Pa and Pb) may possibly remarkably drop for that duration with reduced thermal efficiency, which may adversely affect the weld quality. In particular, this problem was serious in the series welding which is applied to the workpieces in the form of the precision small-sized electronic components.

SUMMARY OF THE INVENTION

The present invention was conceived in view of the above problems involved in the prior art. It is therefore the object of the present invention to provide a polarity switching (AC supply) resistance welding power supply apparatus capable of minimizing a substantial current pause time upon polarity switching as far as possible to enhance thermal efficiency of the resistance welding and to improve the weld quality.

In order to attain the above object, according to an aspect of the present invention there is provided a resistance welding power supply apparatus having a pair of welding electrodes through which a welding current flows, the pair of welding electrodes adapted to come into pressure contact with workpieces to resistance weld the workpieces, the resistance welding power supply apparatus comprising a capacitor for storing resistance welding energy in the form of electric charges; charging means arranged to charge the capacitor; first switching means having a first terminal electrically connected to one electrode of the pair of welding electrodes and having a second terminal electrically connected to a first electrode of the capacitor; second switching means having a first terminal electrically connected to the other electrode of the pair of welding electrodes and having a second terminal electrically connected to a second electrode of the capacitor; third switching means having a first terminal electrically connected to the other electrode of the pair of welding electrodes and having a second terminal electrically connected to the first electrode of the capacitor; fourth switching means having a first terminal electrically connected to the one electrode of the pair of welding electrodes and having a second terminal electrically connected to the second electrode of the capacitor; and control means electrically connected to respective control terminals of the first, second, third and fourth switching means, the control means providing a switching control of the first and second switching means while keeping the third and fourth switching means in OFF-state in a first current-supplying mode where the welding current flows through the workpieces in a first direction, the control means providing a switching control of the third and fourth switching means while keeping the first and second switching means in OFF-state in a second current-supplying mode where the welding current flows through the workpieces in a second direction, the control means upon switching between the first and second current-supplying modes initiating a switching control of the following current-supplying mode in the course of decrease of the welding current based on the preceding current-supplying mode.

In the resistance welding power supply apparatus of the present invention, the first to fourth switching means are electrically connected to the welding electrodes without intervention of any welding transformer, so that a small inductance is present on the load side when viewed from the switching means. For this reason, it is easy upon the switching of the current supplying or of the welding current to interrupt or speed up the fall of the welding current in the preceding current supplying, allowing an instantaneous shift to the following current-supplying mode. Thus, by starting switching control for the following current supplying in the middle of the fall of the welding current, it is possible to immediately reverse the polarity of the welding current or the direction of flow of the current and to resume the supply of power to the workpieces.

The resistance welding power supply apparatus of the present invention may further comprise diodes connected in parallel with the first to fourth switching means, each of the diodes being connected to have an opposite polarity of current to that of corresponding one of the first to fourth switching means. Such a configuration makes freewheel current of the welding current rapidly via some of the diodes when the on/off operating switching means are turned off from ON-state in each current-supplying mode.

Preferably, the control means include switching control means which in the first current-supplying mode iteratively turn on/off only one of the first and second switching means at a predetermined frequency while keeping the other of the first and second switching means in ON-state, the switching control means in the second current-supplying mode iteratively turning on/off only one of the third and fourth switching means while keeping the other of the third and fourth switching means in ON-state. Such a configuration also makes freewheel current of the welding current rapidly via one switching element in ON-state when the other on/off operating switching means are turned off from OFF-state.

In the resistance welding power supply apparatus of the present invention, the switching means may each be comprised of a single switching transistor or a plurality of switching transistors that are connected in parallel.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENT

The present invention will now be described with reference to FIGS. 1 to 9 which illustrate a presently preferred embodiment thereof in a non-limitative manner.

Figure 1:
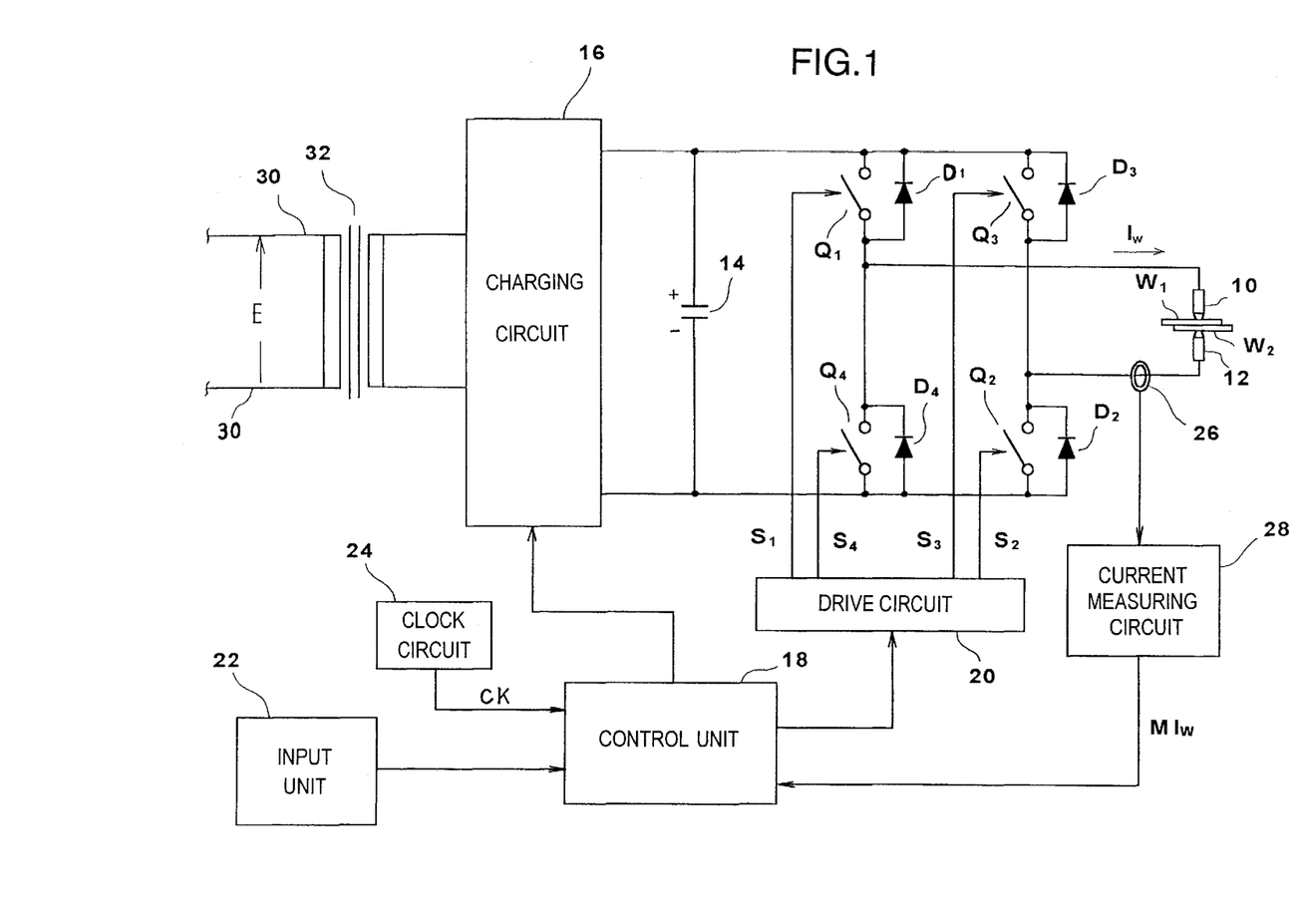
FIG. 1 is a circuit diagram showing a configuration of a resistance welding power supply apparatus in accordance with an embodiment of the present invention.

Referring first to FIG. 1, there is depicted a configuration of a resistance welding power supply apparatus in accordance with the embodiment of the present invention. The resistance welding power supply apparatus comprises a large-capacitance capacitor 14 for storing resistance welding energy in the form of electric charge, a charging circuit 16 for charging the capacitor 14 up to a predetermined voltage, four switching elements or means $Q_1$, $Q_2$, $Q_3$ and $Q_4$ that are electrically connected between the capacitor 14 and a pair of welding electrodes 10 and 12, and a control unit 18 allowing a selective switching operation during the supply of welding current to provide a control of a welding current $I_W$. The welding electrodes 10 and 12 are coupled to a pressure mechanism not shown so that they can come into pressure contact with workpieces ($W_1$ and $W_2$) during the welding work.

The switching elements $Q_1$ to $Q_4$ may each be comprised of a single or a plurality of switching transistors, e.g., FETs (field-effect transistors) that are connected in parallel. The first switching element $Q_1$ has one terminal electrically connected to the welding electrode 10 and the other terminal electrically connected to a positive terminal of the capacitor 14. The second switching element $Q_2$ has one terminal electrically connected to the welding electrode 12 and the other terminal electrically connected to a negative terminal of the capacitor 14. The third switching element $Q_3$ has one terminal electrically connected to the welding electrode 12 and the other terminal electrically connected to the positive terminal of the capacitor 14. The fourth switching element $Q_4$ has one terminal electrically connected to the welding electrode 10 and the other terminal electrically connected to the negative terminal of the capacitor 14. In parallel with the switching elements $Q_1$, $Q_2$, $Q_3$ and $Q_4$ are connected respectively diodes $D_1$, $D_2$, $D_3$ and $D_4$ respectively having opposite polarities of current to the corresponding ones.

The first to fourth switching elements $Q_1$, $Q_2$, $Q_3$ and $Q_4$ are independently switching (ON/OFF) controlled by first to fourth switching control signals $S_1$, $S_2$, $S_3$ and $S_4$, respectively, that are fed from the control unit 18 by way of a drive circuit 20. As will be described later, in a positive current-supplying mode where a welding current $I_W$ flows through the workpieces ($W_1$ and $W_2$) in the positive direction, the first and second switching elements $Q_1$ and $Q_2$ are ON/OFF controlled at a predetermined timing with the third and fourth switching elements $Q_3$ and $Q_4$ remaining OFF. In a negative current-supplying mode where the welding current $I_W$ flows through the workpieces ($W_1$ and $W_2$) in the negative direction, the third and fourth switching elements $Q_3$ and $Q_4$ are ON/OFF controlled at a predetermined timing while keeping the first and second switching elements $Q_1$ and $Q_2$ in OFF-state.

The control unit 18 is comprised of, e.g., a microprocessor (CPU) or a dedicated logic circuit to provide a control of parts such as a current-supplying sequence control, a constant-current control and a capacitor charging control in compliance with a predetermined program or procedure. The control unit 18 receives various setting values from an input unit 22 including e.g., a keyboard, etc., and receives a 100 kHz clock signal CK for current-supplying control from a clock circuit 24.

For feedback of the welding current $I_W$ in the constant-current control, a toroidal coil 26 acting as a current sensor is fitted to one of conductors extending between the switching circuit ($Q_1$ to $Q_4$) and the welding electrodes 10 and 12 so that on a basis of an output signal from the current sensor 26 a current measuring circuit 28 can figure out a current measured value, e.g., an effective value or a mean value of the welding current $I_W$ for each cycle of a switching frequency and give the thus obtained current measured value $MI_W$ to the control unit 18.

The charging circuit 16 accepts a single-phase AC power supply voltage E of a commercial frequency via a step-up transformer 32 from an AC power supply line 30. The charging circuit 16 may be comprised of a single-phase rectifying circuit for rectifying a single-phase AC voltage from the transformer 32 into a DC voltage, with a switching circuit for charging being interposed between an output terminal of the rectifying circuit and the capacitor 14 to variably control a charging voltage of the capacitor 14 in a more precise fashion. For charging control there may further be provided, e.g., voltage measuring means not shown which measure the charging voltage of the capacitor 14.

The resistance welding power supply apparatus is conveniently applied to two-point simultaneous joining resistance welding (series welding). Referring then to FIGS. 2 to 8, description will be made of the operative function which will be obtained when applied to the series welding.

Figure 2:
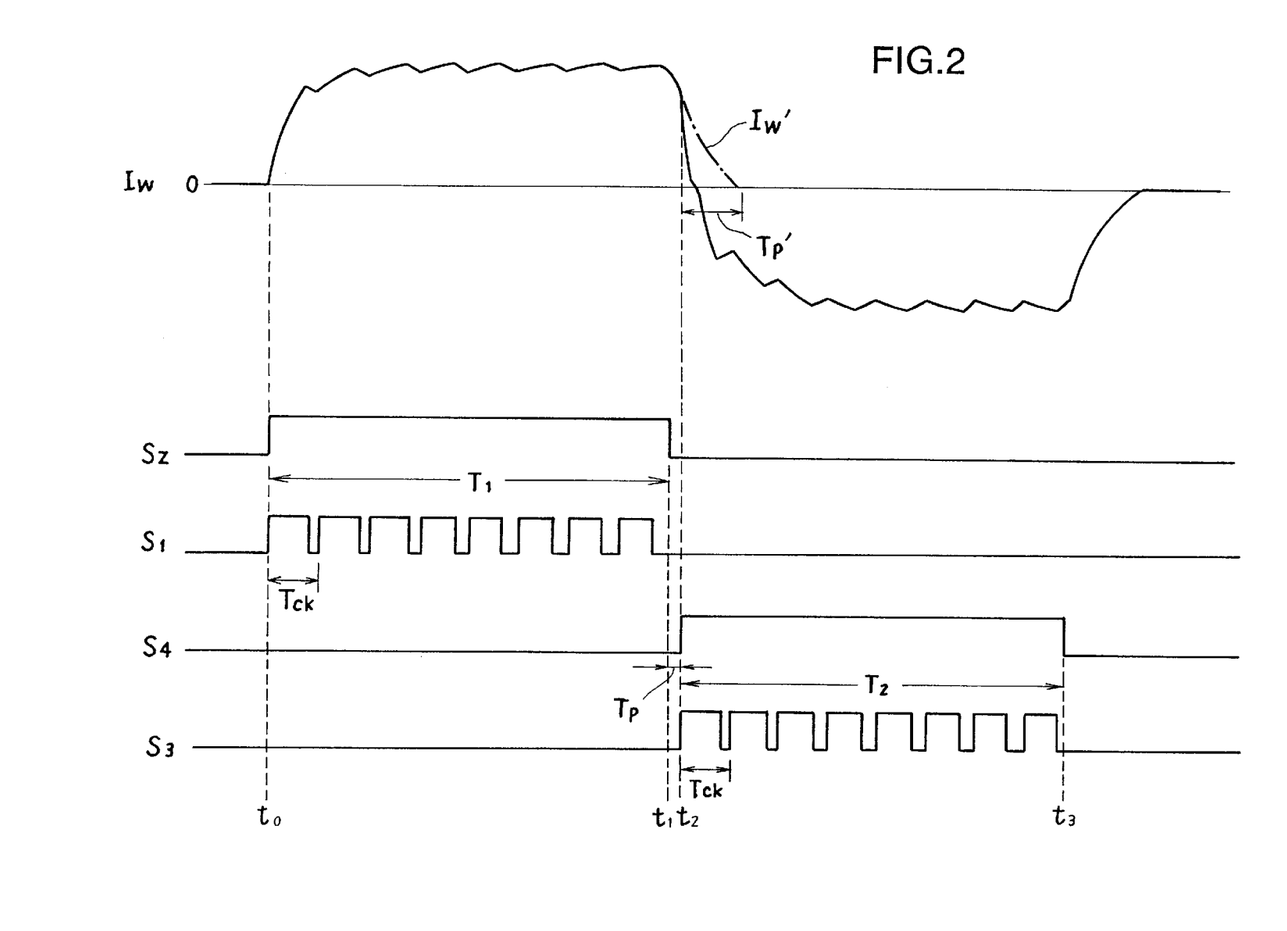
FIG. 2 is a waveform diagram showing waveforms of current or signals at parts of the power supply apparatus of the embodiment.

By way of example, in case of performing the series welding similar to FIG. 9, the input unit 22 and the control unit 18 divide the weld period for a single resistance welding into two weld periods, i.e., a first weld period $T_1$ during which a positive current flows and a second weld period $T_2$ during which a negative current-supplying mode is effected, with a switching pause period $T_p$ intervening between the two weld periods $T_1$ and $T_2$ for changeover of polarity (FIG. 2).

The switching pause period $T_p$ of this embodiment is set to a time (e.g., 10 μs) fairly shorter than a time $T_{p'}$ (e.g., about 200 μs) required for the positive welding current $I_W$ to fall to substantially a zero level (in a waveform indicated by a dotted line $I_{W'}$ of FIG. 2) when keeping all the switching elements $Q_1$ to $Q_4$ in OFF-state after the halt of the switching operation of the positive current supplying in the first current weld period $T_1$.

When starting the welding current supplying with the welding electrodes 10 and 12 in pressure contact with the workpieces ($W_1$ and $W_2$) as seen in FIG. 9, the control unit 18 provides a switching control in the positive current-supplying mode during the first weld period $T_1$. More specifically, the control unit 18 continuously sets the second switching control signal $S_2$ high and intermittently sets the first switching signal $S_1$ high in a pulse-width-variable fashion at a cycle $T_{ck}$ of the clock signal CK, while keeping the third and fourth switching control signals $S_3$ and $S_4$ low. As a result, the second switching element $Q_2$ is kept ON and the first switching element $Q_1$ is iteratively ON-OFF controlled at the cycle $T_{ck}$, with the third and fourth switching elements $Q_3$ and $Q_4$ remaining OFF.

Figure 3:
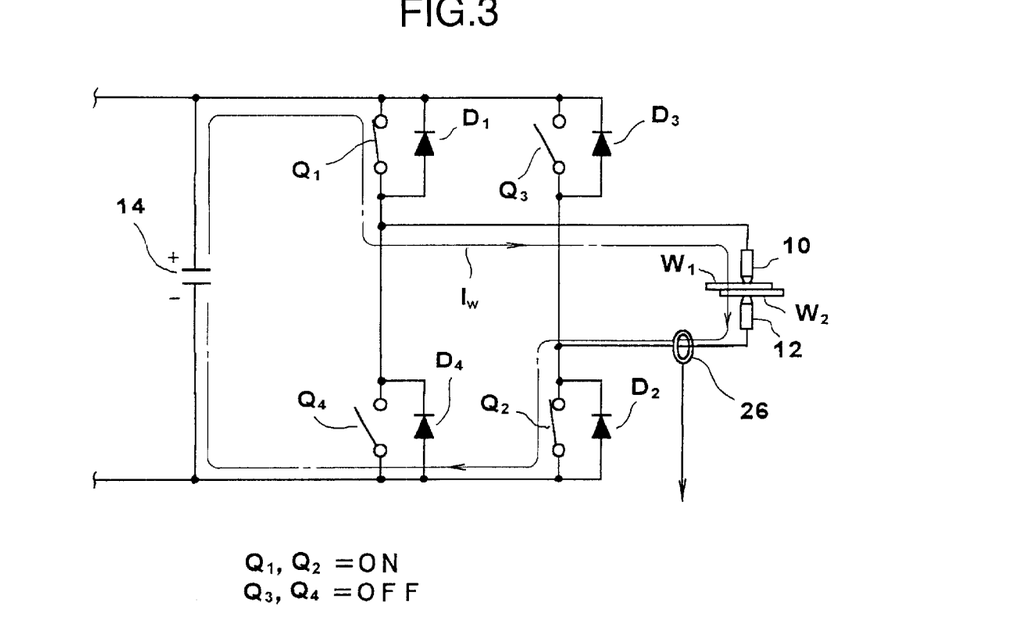
FIG. 3 is a circuit diagram showing a current-supplying circuit through which a welding current flows in one switching state in the power supply apparatus of the embodiment.
Figure 4:
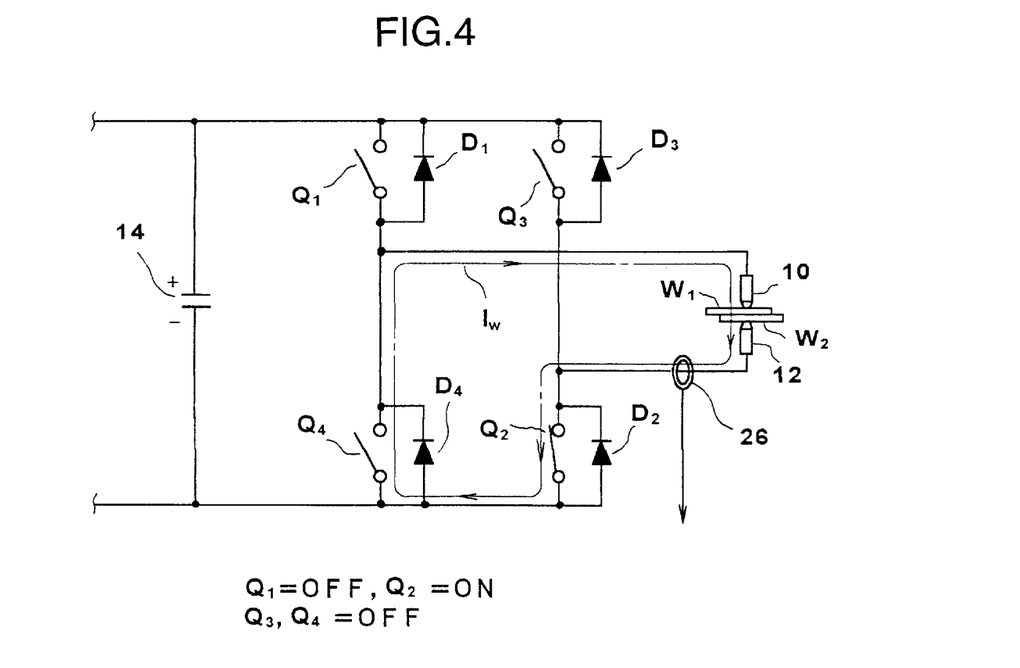
FIG. 4 is a circuit diagram showing a current-supplying circuit through which a welding current flows in one switching state in the power supply apparatus of the embodiment.

When the first switching element $Q_1$ is on in each switching cycle $T_{ck}$, as shown in FIG. 3, the welding current $I_W$ flows in a positive direction through a path extending from the positive electrode of the capacitor 14 through the first switching element $Q_1$, the welding electrode 10, the workpieces ($W_1$ and $W_2$), the welding electrode 12 and the second switching element $Q_2$ to the negative electrode of the capacitor 14. On the contrary, even when the first switching element $Q_1$ is off, as seen in FIG. 4 the welding current $I_W$ flows in a positive direction through a closed circuit starting from the welding electrode 10, passing through the workpieces ($W_1$ and $W_2$), the welding electrode 12, the second switching circuit $Q_2$ and the fourth diode $D_4$ and returning to the welding electrode 10. The welding current $I_W$ at that time flows through the closed circuit on the basis of electromagnetic energy stored in the inductance of the load circuit containing the welding electrodes 10 and 12 and the workpieces ($W_1$ and $W_2$), with little or substantially no welding current flowing through the capacitor 14.

The ON-time (pulse width) of the first switching element $Q_1$ in each switching cycle $T_{ck}$ may variably be controlled by pulse-width-modulation (PWM) so as to allow the welding current $I_W$ to conform to a predetermined current set value by the constant-current control.

The control unit 18 times the first weld period $T_1$, stops the above positive current-supplying mode switching control at its ending time ($t_1$), sets both the first and second switching control signals $S_1$ and $S_2$ low, and places both the first and second switching elements $Q_1$ and $Q_2$ to OFF-position. This temporarily turns off all the switching elements $Q_1$ to $Q_4$ at that time ($t_1$). A shift is thus made from the positive current-supplying mode to the switching pause period $T_p$.

Figure 5:
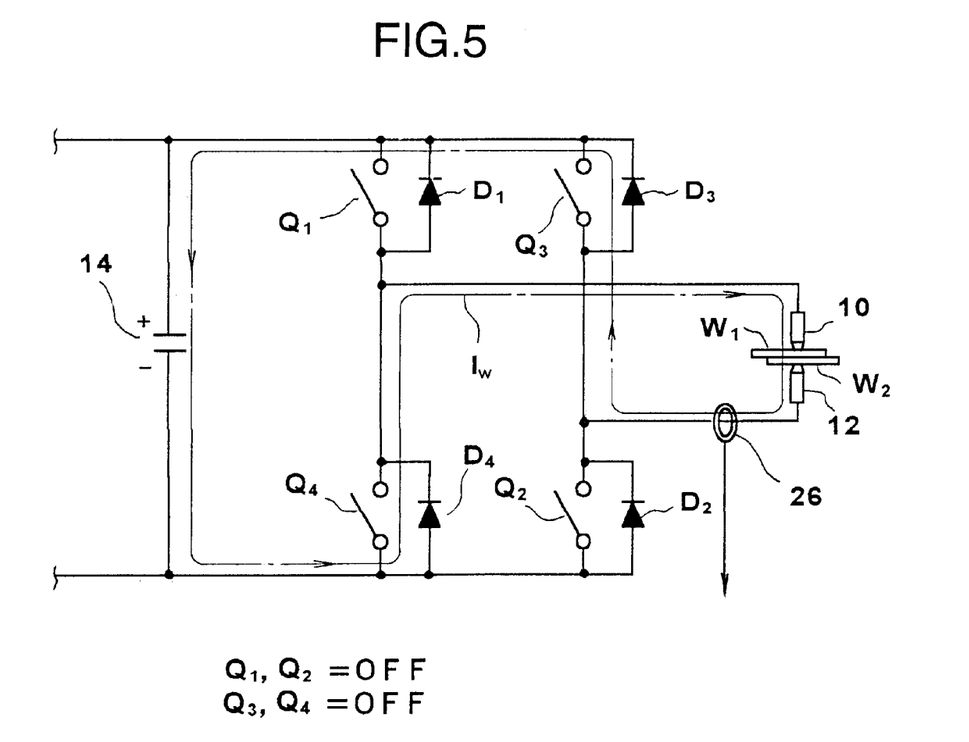
FIG. 5 is a circuit diagram showing a current-supplying circuit through which a welding current flows in one switching state in the power supply apparatus of the embodiment.

In the switching pause period $T_p$, as shown in FIG. 5, the welding current $I_W$ flows in a positive direction through a closed circuit starting from the welding electrode 10, passing through the workpieces ($W_1$ and $W_2$), the welding electrode 12, the third diode $D_3$, the positive electrode of the capacitor 14, the negative electrode of the capacitor 14 and the fourth diode $D_4$, and returning to the welding electrode 10. The welding current $I_W$ at that time is also a freewheeling current based on the electromagnetic energy stored in the inductance of the load circuit containing the welding electrodes 10 and 12 and the workpieces ($W_1$ and $W_2$), that welding current acting as a charging current of the capacitor 14. This power supply apparatus does not include any transformer between the switching circuit and the welding electrodes, and hence the inductance of the load circuit is much smaller than that of the inverter power supply apparatus. Accordingly, the freewheeling current rapidly charges the capacitor 14 for extinction immediately after the stop of the current, so that the fall of the welding current $I_W$ is much faster than that of the inverter power supply apparatus.

Furthermore, the control unit 18 of this embodiment terminates the switching pause period $T_p$ in an extremely brief time (e.g., 10 μs) and starts the negative current-supplying mode switching control in the second weld period $T_2$ at the time ($t_2$) in the middle of the fall of the welding current $I_W$. In this negative current-supplying mode, the control unit 18 continuously sets the fourth switching control signal $S_4$ high and intermittently sets the third switching signal $S_3$ high in a pulse-width-variable fashion at the cycle $T_{ck}$ of the clock signal CK by the PWM control similar to the above, while keeping the first and second switching control signals $S_1$ and $S_2$ low. As a result, the fourth switching element $Q_4$ is kept ON and the third switching element $Q_3$ is iteratively ON-OFF controlled at the cycle $T_{ck}$ by the PWM, with the first and second switching elements $Q_1$ and $Q_2$ remaining OFF.

When both the third and fourth switching elements $Q_3$ and $Q_4$ turn on immediately after the start of the second weld period $T_2$, the welding current $I_W$ in turn flows in a negative direction.

Figure 6:
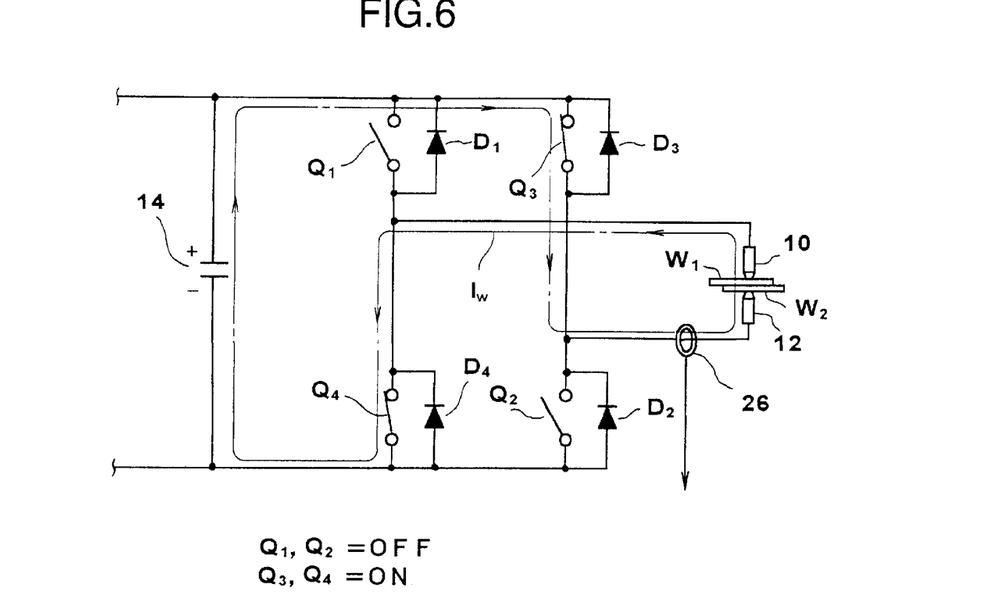
FIG. 6 is a circuit diagram showing a current-supplying circuit through which a welding current flows in one switching state in the power supply apparatus of the embodiment.

More specifically, as shown in FIG. 6, the welding current $I_W$ flows through the workpieces ($W_1$ and $W_2$) in a negative direction by way of a path extending from the positive electrode of the capacitor 14 through the third switching element $Q_3$, the welding electrode 12, the workpieces ($W_1$ and $W_2$), the welding electrode 10 and the fourth switching circuit $Q_4$ and to the negative electrode of the capacitor 14.

Figure 7:
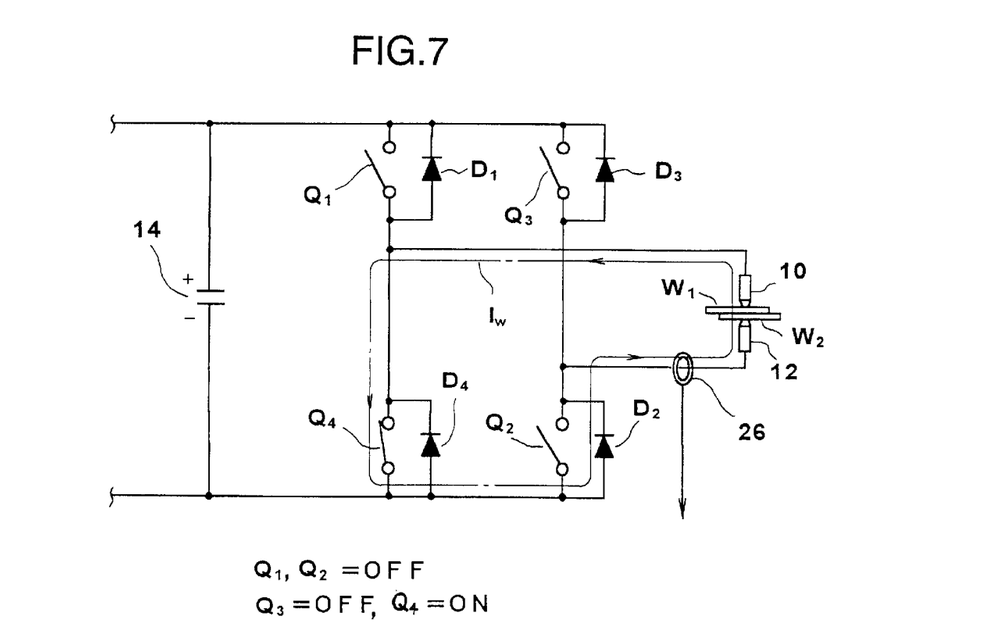
FIG. 7 is a circuit diagram showing a current-supplying circuit through which a welding current flows in one switching state in the power supply apparatus of the embodiment.

When the third switching element $Q_3$ is turned off, as shown in FIG. 7, a freewheeling current due to the inductance of the load circuit flows as the negative welding current $I_W$ through a closed circuit starting from the welding electrode 12, passing through the workpieces ($W_1$ and $W_2$), welding electrode 10, the fourth switching element $Q_4$ and the second diode $D_2$ and returning to the welding electrode 12.

Similarly, in each of switching cycles $T_{ck}$ which follow in the second weld period $T_2$, the welding current $I_W$ flows in a negative direction through the current-supplying circuit of FIG. 6 when the third switching element $Q_3$ is ON and also flows in a negative direction through the freewheeling circuit of FIG. 7 when the third switching element $Q_3$ is OFF.

It is to be noted that two or more switching cycles $T_{ck}$ may be used for reversing the welding current $I_W$ from positive polarity to negative polarity immediately after the start of the second weld period $T_2$.

The control unit 18 times the second weld period $T_2$, ceases the above negative current-supplying mode switching control at its ending time ($t_3$), sets both the third and fourth switching control signals $S_3$ and $S_4$ low, and places both the third and fourth switching elements $Q_3$ and $Q_4$ to OFF-position. This temporarily turns off all the switching elements $Q_1$ to $Q_4$ to bring all the welding current to a termination.

In the series welding of FIG. 9, under the influence of Peltier effect as described above, a nugget Nb at a second weld point Pb grows at a greater growth rate than a nugget Na at a first weld point Pa in the positive current supply, whereas the nugget Na at the first weld point Pa grows at a greater growth rate than the nugget Nb at the second weld point Pb in the negative current supply. In the power supply apparatus of this embodiment as well, by setting the weld periods $T_1$ and $T_2$ of both the polarities to proper lengths with a well-balanced manner, the influence of Peltier effect can be cancelled so that the nuggets Na and Nb at the weld points Pa and Pb, respectively, can grow to substantially the same dimensions.

Figure 8:
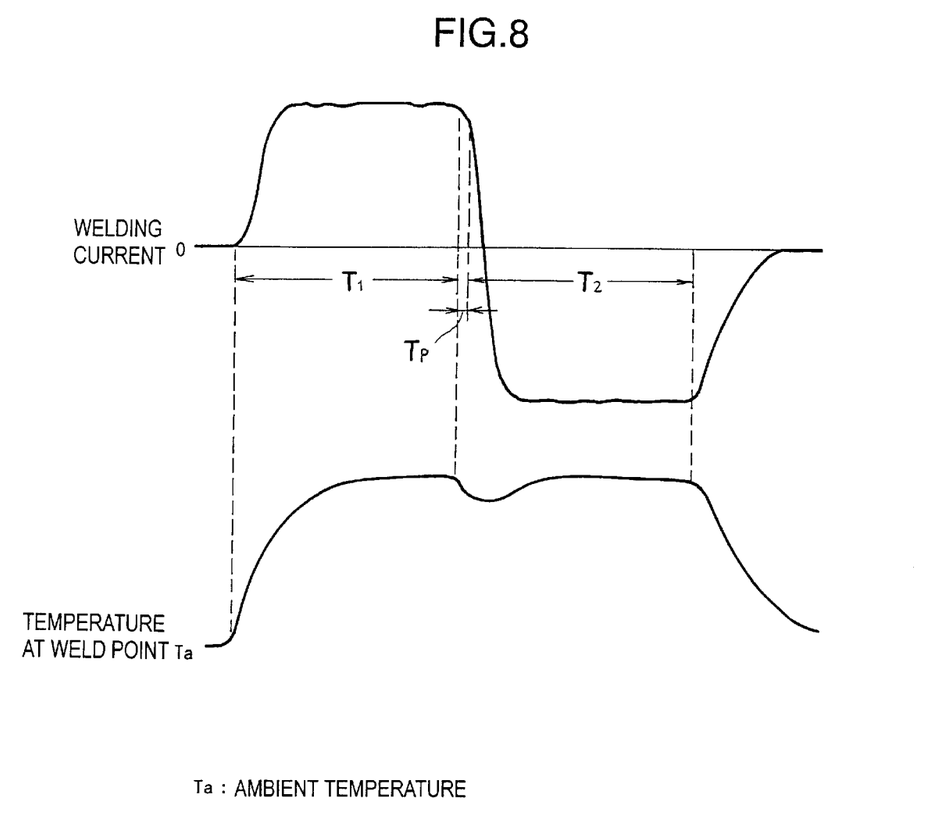
FIG. 8 illustrates time characteristics (waveforms) of the temperature at a weld point during a weld time in the power supply apparatus of the embodiment.

Furthermore, in the power supply apparatus of this embodiment, as described above, the switching pause period Tp can be set to an extremely brief time (e.g., 10 μs) by initiating the switching control of the negative polarity current in the course of the fall, preferably immediately after the start of the fall, of the positive welding current by the positive current supplying upon switching from the preceding positive current-supplying mode to the following negative current-supplying mode. As a result of this, as seen in FIG. 8, the temperature drop at the weld points (esp., near the weld points Pa and Pb) upon the switching of the current polarity can be reduced to as small a level as possible.

In this manner, the temperature at the weld points can stably be kept throughout the full weld time, so that the thermal efficiency of the resistance welding can remarkably be improved. Such improvement of the thermal efficiency enables the weld periods ($T_1$, $T_2$) for obtaining desired nuggets or weld strength to be set to a shorter time than before with the improved weld quality and saved electric energy. According to the technique of the present invention, an especially remarkable effect is obtained in cases particularly where the workpieces ($W_1$, $W_2$) are precision small-sized metallic members or components in the series welding as in FIG. 9.

Although in the above embodiment the former half of the full weld time has been assigned to the positive current-supplying mode with the latter half thereof assigned to the negative current-supplying mode, the order may be inverted to assign the former half to the negative current-supplying mode with the latter half assigned to the positive current-supplying mode. The relationship between the pair of switching elements ($Q_1$, $Q_2$) and ($Q_3$, $Q_4$) switching controlled with the same polarity may variously modified. For example, in the positive current-supplying mode, the second switching element $Q_2$ may be turned ON/OFF at a predetermined frequency while keeping the first switching element $Q_1$ in ON-state. Alternatively, the two switching elements $Q_1$ and $Q_2$ may be turned ON/OFF at the same timing.

In this event, in each switching cycle $T_{ck}$ of the positive current-supplying mode, the welding current $I_W$ flows in a positive direction through the current-supplying circuit of FIG. 3 when the two switching elements $Q_1$ and $Q_2$ are simultaneously ON but through the freewheeling circuit of FIG. 5 when the two switching elements $Q_1$ and $Q_2$ are simultaneously OFF.

Although in the above embodiment the diodes $D_1$ to $D_4$ have been connected in parallel with the switching elements $Q_1$ to $Q_4$, respectively, only the switching elements $Q_1$ to $Q_4$ may solely be provided for freewheeling current. For instance, the current flows through the diode $D_4$ in FIG. 4, whereas the switching element $Q_4$ may be turned ON at that time.

The resistance welding power supply apparatus of the present invention is applicable to various types of resistance welding other than the series welding as in FIG. 9, and the current-supplying cycles of the AC waveform may have any desired cycles more than one.

Although the above embodiment has employed the constant-current control system for the switching control of the switching elements $Q_1$ to $Q_4$, a constant-voltage control system, a constant-power control system, etc., may be employed to provide a constant control of the voltage or power across the welding electrodes.

According to the resistance welding power supply apparatus of the present invention, as set forth hereinabove, the substantial current halt time upon the polarity switching can be minimized as far as possible with enhanced thermal efficiency of the resistance welding and with the improved weld quality.

While illustrative and presently preferred embodiment of the present invention has been described in detail herein, it is to be understood that the inventive concepts may be otherwise variously embodied and employed and that the appended claims are intended to be construed to include such variations except insofar as limited by the prior art.

What is claimed is:

1. A resistance welding power supply apparatus having a pair of welding electrodes through which a welding current flows, said pair of welding electrodes adapted to come into pressure contact with workpieces to resistance weld said workpieces, said resistance welding power supply apparatus comprising:

a capacitor for storing resistance welding energy in the form of electric charges;

charging means arranged to charge said capacitor;

first switching means having a first terminal electrically connected to one electrode of said pair of welding electrodes and having a second terminal electrically connected to a first electrode of said capacitor;

second switching means having a first terminal electrically connected to the other electrode of said pair of welding electrodes and having a second terminal electrically connected to a second electrode of said capacitor;

third switching means having a first terminal electrically connected to said other electrode of said pair of welding electrodes and having a second terminal electrically connected to said first electrode of said capacitor;

fourth switching means having a first terminal electrically connected to said one electrode of said pair of welding electrodes and having a second terminal electrically connected to said second electrode of said capacitor; and control means electrically connected to respective control terminals of said first, second, third and fourth switching means, said control means providing a switching control of said first and second switching means while keeping said third and fourth switching means OFF in a first current-supplying mode where said welding current flows through said workpieces in a first direction, said control means providing a switching control of said third and fourth switching means while keeping said first and second switching means OFF in a second current-supplying mode where said welding current flows through said workpieces in a second direction, said control means upon switching between said first and second current-supplying modes initiating a switching control of the following current-supplying mode in the course of decrease of said welding current based on the preceding current-supplying mode.

2. The resistance welding power supply apparatus according to claim 1, further comprising diodes connected in parallel with said first to fourth switching means, each of said diodes being connected to have an opposite polarity of current to that of corresponding one of said first to fourth switching means.

3. The resistance welding power supply apparatus according to claim 2, wherein said control means include switching control means which in said first current-supplying mode iteratively turn on/off only one of said first and second switching means at a predetermined frequency while keeping the other of said first and second switching means in ON-state, said switching control means in said second current-supplying mode iteratively turning on/off only one of said third and fourth switching means while keeping the other of said third and fourth switching means in ON-state.

4. The resistance welding power supply apparatus according to claim 3, wherein said first to fourth switching means are each comprised of a single switching transistor or a plurality of switching transistors that are connected in parallel.

5. The resistance welding power supply apparatus according to claim 2, wherein said first to fourth switching means are each comprised of a single switching transistor or a plurality of switching transistors that are connected in parallel.

6. The resistance welding power supply apparatus according to claim 1, wherein said control means include switching control means which in said first current-supplying mode iteratively turn on/off only one of said first and second switching means at a predetermined frequency while keeping the other of said first and second switching means in ON-state, said switching control means in said second current-supplying mode iteratively turning on/off only one of said third and fourth switching means while keeping the other of said third and fourth switching means in ON-state.

7. The resistance welding power supply apparatus according to claim 6, wherein said first to fourth switching means are each comprised of a single switching transistor or a plurality of switching transistors that are connected in parallel.

8. The resistance welding power supply apparatus according to claim 1, wherein said first to fourth switching means are each comprised of a single switching transistor or a plurality of switching transistors that are connected in parallel.

* * * * *